(12) United States Patent
Chang

(10) Patent No.: US 6,176,398 B1
(45) Date of Patent: Jan. 23, 2001

(54) EFFECTIVE TRIGGER GRIP POWER DEVICE FOR CAULK DISPENSING DEVICES

(76) Inventor: Peter J. Chang, 11001 Petersborough Dr., Rockville, MD (US) 20852

( * ) Notice: Under 35 U.S.C. 154(b), the term of this patent shall be extended for 0 days.

(21) Appl. No.: 09/408,763

(22) Filed: Sep. 30, 1999

(51) Int. Cl.$^7$ .............................. G01F 11/00; F16H 27/02; F16H 55/26
(52) U.S. Cl. ............................ 222/391; 74/141.5; 74/169
(58) Field of Search ........................... 222/391; 74/141.5, 74/169

(56) References Cited

U.S. PATENT DOCUMENTS

| | | | | |
|---|---|---|---|---|
| 4,356,983 | * | 11/1982 | Kayser | 222/391 |
| 5,887,765 | * | 3/1999 | Broesamle | 222/391 |

\* cited by examiner

Primary Examiner—Kevin Shaver
Assistant Examiner—David A Bonderer
(74) Attorney, Agent, or Firm—Law offices of Royal W. Craig

(57) ABSTRACT

An effective trigger grip power device is disclosed for countering piston rod lock due to wear and tear in conventional manual caulking guns. The device is shown in the context of an open frame (which may be a single piece of molded plastic) having a downwardly extending handle. A piston rod is slidably supported in the frame for dispensing caulking composition, and a trigger is pivoted to the frame and retractable against the handle. The effective trigger grip power device is positioned behind the gripping member and generally has a pushing member at one end for bearing against the gripping member to urge it into a vertical position, and a base section that is slidably channeled through the frame and extending rearwardly to said release lever for actuation thereby. In operation, depression of the release lever drives the effective trigger grip power device to urge the gripping member into a substantially vertical position to eliminate trigger lock. Two alternative configurations of the effective trigger grip power device are disclosed.

18 Claims, 7 Drawing Sheets

EFFECTIVE TRIGGER GRIP POWER DEVICE FOR CAULK DISPENSING DEVICES

FIELD OF THE INVENTION

The present invention relates to dispensing devices and, more particularly, to improved drive mechanisms for hand-held caulk guns that include an effective trigger grip power device ("ETG") for maintaining effective thrust operation in a dispensing device for high viscosity fluids, such as a caulking gun.

BACKGROUND OF THE INVENTION

Conventional economy brand caulking guns are generally manual trigger-operated devices incorporating a unidirectional gripping assembly which urges a piston rod forward to eject the compound from a cartridge. As shown in FIG. 1 (prior art), a common gripping assembly includes a piston rod 4 passing through a gripping plate 6 that, in turn, is controlled by the operation of a trigger 8 to grip and move the piston rod 4 in a forward direction for dispensing the caulking composition. The trigger 8 cants the gripping plate 6 clockwise when the trigger is actuated until it grips the piston rod 4, thereafter urging the piston rod 4 forward. Upon release of the trigger 8, the gripping plate 6 is returned to a neutral upright position to allow retraction of the piston rod 4. However, the piston rod 4 also passes through a release plate 10 that prevents undesired retraction of the piston rod 4. The release plate 10 is commonly located at the rear of the gun and remains disengaged from the piston rod 4 during dispensation. However, when the trigger 8 is released, the release plate 10 rides the piston rod 4 rearwardly and becomes increasingly canted relative to the piston rod 4 until it engages the piston rod to thereby prevent inadvertent retraction. The user must depress the release plate 10 to free the piston rod 4 for full retraction.

Over time the alternating clockwise and counterclockwise torques imposed on the steel thrust components of the above-described mechanism tend to create wear and tear tolerances. Specifically, the hole through the gripping plate 6 and the release plate 10 become enlarged. These wear tolerances combine with the inherent manufacturing tolerances to the point that they effect the operation of the gripping plate and release plate. The effects includes excessive trigger slack and "piston rod lock". With regard to FIG. 1, piston rod lock occurs when the hole in the gripping plate becomes so large that the gripping plate tends to return past its normally-neutral upright position (ø1) to an oppositely-canted position (ø2) Because of the undesired cant of angle (ø2), the rod 4 again grips the piston rod 4, and the rod 4 cannot be pulled back even if the release plate 10 is released.

There have been previous attempts at implementing wear compensating devices to prevent the above-described problem. For instance, U.S. Pat. No. 5,370,282 to Sedlmeier shows an advancing mechanism (6) with two pivoting clamping levers (12, 13) mounted on the piston rod (7). Clamping lever (12) is for forward advancement while lever (13) prevents retreat. Two springs (14, 15) are required, each in contact with a corresponding clamping lever (12, 13). In addition, an unlocking lever (17) operates via a transmission element 18 to substantially simultaneously unlock both of the clamping levers (12, 13) to free the piston rod (7). The clamping lever 13 rests in a pendular manner in a recess of the frame 5. When the piston rod 7 moves forward, the clamping lever 13 pivots forward along with rod 7 to a perpendicular position (clockwise about the top). When the rod 7 is released, the clamping lever 13 pivots backward (counterclockwise about the top) until it inclines enough to bite the rod 7, thereby locking it in position. When the cartridge is spent, the unlocking lever (17) operates through the transmission element 18 to kick clamping lever 13 forward to release the rod. Thus, the use of the transmission element 18 to unlock both of the clamping levers (12, 13) somewhat resolves the problem of a worn gripping plate that returns past its normally-neutral upright position to improperly regrip the piston rod. However, the '282 transmission element 18 is a small tube that rides the piston rod. It is only capable of pushing against the immediate periphery of the hole in the clamping lever 13. This gives the transmission element 18 very poor leverage against the rod, and as wear becomes worse the transmission element 18 loses its ability to return the clamping lever 13 to a vertical position. The problem of piston rod lock reoccurs. Moreover, the thrust mechanism is complex inasmuch as it requires two separate pivoting clamping levers (one for moving the piston rod forward and one for locking the piston rod in the forward position), two springs each contacting one of the clamping levers, plus a release lever, and the transmission element. The additional parts and labor greatly increases manufacturing costs and assembly time.

Similarly, U.S. Pat. No. 5,823,403 to Schneider shows a drive mechanism that provides a double-lever action to bias the gripping plate into a neutral position in a controlled manner to permit the piston rod to be retracted. A gripping (or recoil) plate 52 is normally biased by spring 50 into a canted position to prevent rearward movement of the piston rod 26. However, when the piston rod 26 moves forwardly the recoil plate 52 pivots forward along with rod 26 to a perpendicular position (counter-clockwise about the bottom) and rod 26 becomes free to slide through the recoil plate 52. The recoil plate 52 is situated rearwardly of the frame and this necessitates a backplate 40. The '403 patent appears to be functionally similar to the above-described '282 patent except that the release lever 17 of the '282 gun kicks both levers 12 and 13 out via sleeve 18, while the '403 lever 62 only kicks out the recoil plate 52. Otherwise, both mechanisms requires three separate pivoting levers (one for moving the piston rod forward, one for locking the piston rod in the forward position, and a release plate). Moreover, both require two springs each contacting one of the clamping levers, plus a transmission element. The sleeve 18 only pushes against the immediate periphery of the hole (giving it very poor leverage against the rod), and this provides a temporary solution at best to the wear problem because sleeve 18 eventually loses its ability to prevent piston rod lock.

It would be advantageous to provide a more reliable solution to piston rod lock and other wear-and-tear problems to ensure proper advancing and releasing operation in an economical two-lever drive assembly.

SUMMARY OF THE INVENTION

In accordance with the above, it is an object of the present invention to provide simpler, less costly, and more efficient drive assemblies with simple economical gripping plate canting device that compensates for piston rod lock and other problems caused by wear and tolerances to ensure proper advancing and releasing operation.

In accordance with the present invention, there are disclosed various embodiments of an effective trigger grip power device ("ETG") for conventional manual caulking guns. The drive assemblies are shown in the context of an open frame (which may be a single piece of molded plastic) having a downwardly extending handle. A piston rod is slidably supported in the frame for dispensing caulking composition, and a trigger is pivoted to the frame and retractable against the handle. The effective trigger grip device is positioned behind the gripping member and generally has a pushing member at one end for bearing against the gripping member to urge it into a vertical position, and a base section that is slidably channeled through the frame and extending rearwardly to said release lever for actuation thereby. In operation, depression of the release lever drives the effective trigger grip device to urge the gripping member into a substantially vertical position to eliminate trigger lock.

Two alternative configurations of the effective trigger grip device ("ETG") are disclosed.

In the first, the pushing member of the ETG device comprises an offset finger for bearing against the top of said gripping member, and the base section is a tubular sleeve that encircles the piston rod and passes rearwardly out through the frame to said release lever for actuation thereby.

In a second embodiment, the pushing member of the ETG device is an annular disk for bearing against the gripping member, and the base section comprises opposing prongs that straddle the piston rod and pass rearwardly out through the frame to said release lever for actuation thereby.

Both of the above-described ETG devices in the context of the drive mechanism provide a more reliable solution to piston rod lock and other wear-and-tear problems to ensure proper advancing and releasing operation in an economical two-lever drive assembly.

DETAILED DESCRIPTION OF THE PREFERRED EMBODIMENTS

Figure 1:
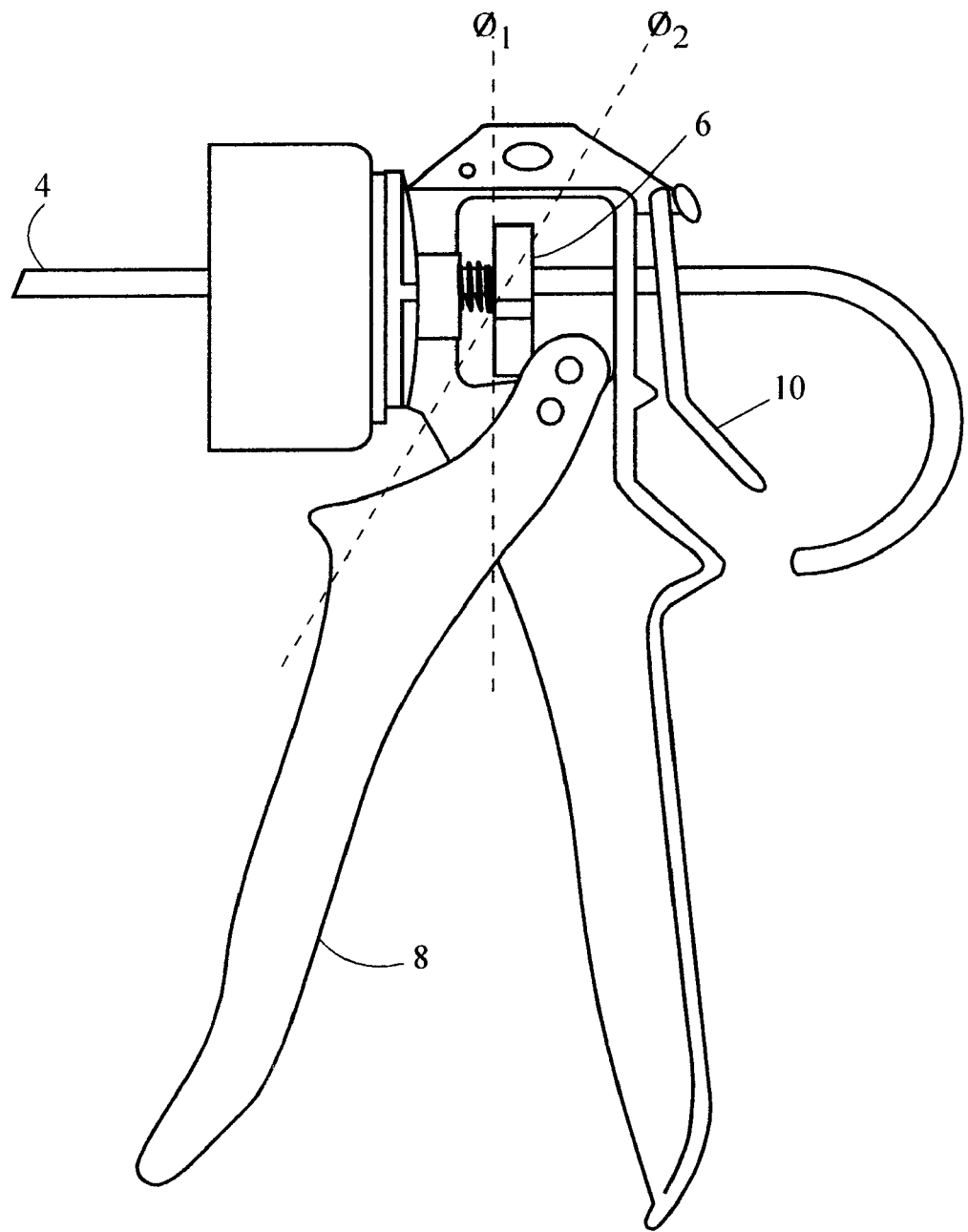
FIG. 1 is a prior art drive mechanism incorporated in an open frame caulking gun.
Figure 2:
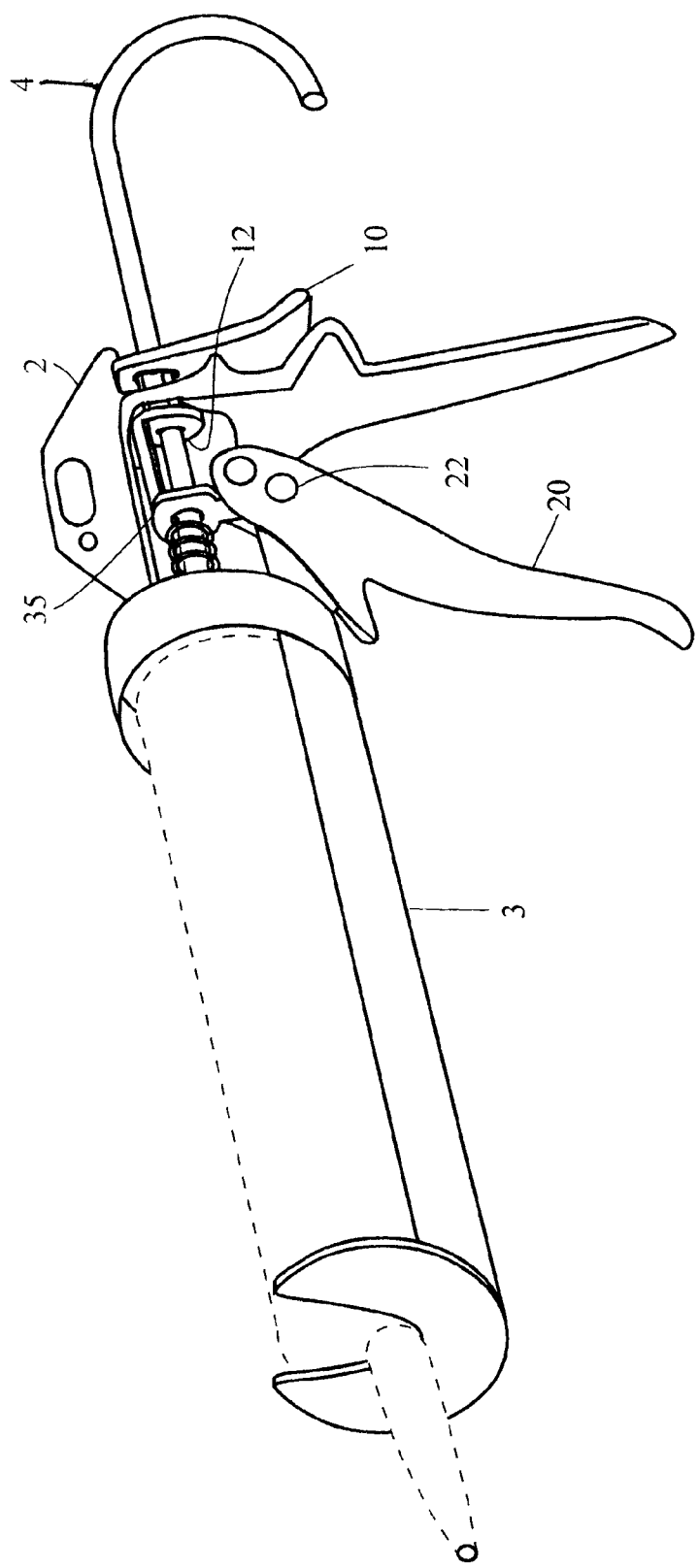
FIG. 2 is a side perspective view of a drive mechanism incorporating an effective trigger grip power device 12 according to the present invention.

FIG. 2 is a side perspective view of a drive mechanism incorporating an effective trigger grip power device 12 according to the present invention.

The caulking gun generally includes an open frame 2 which may be integrally molded of plastic, fiberglass, or other composition. The open frame 2 includes a forward barrel assembly 3 for slidably guiding a piston (not shown) mounted at the distal end of a piston rod 4. The forward section may be adapted for carrying a conventional caulk cartridge, or it may be a refillable barrel-type reservoir for containing loose composition. The piston rod 4 is driven by a drive mechanism carried in a rearward section of the open frame 2. The drive mechanism includes a trigger 20 which is shown pivoted at a screw hinge 22 located below piston rod 4. An upper portion of trigger 20 extends past screw hinge 22.

Figure 3:
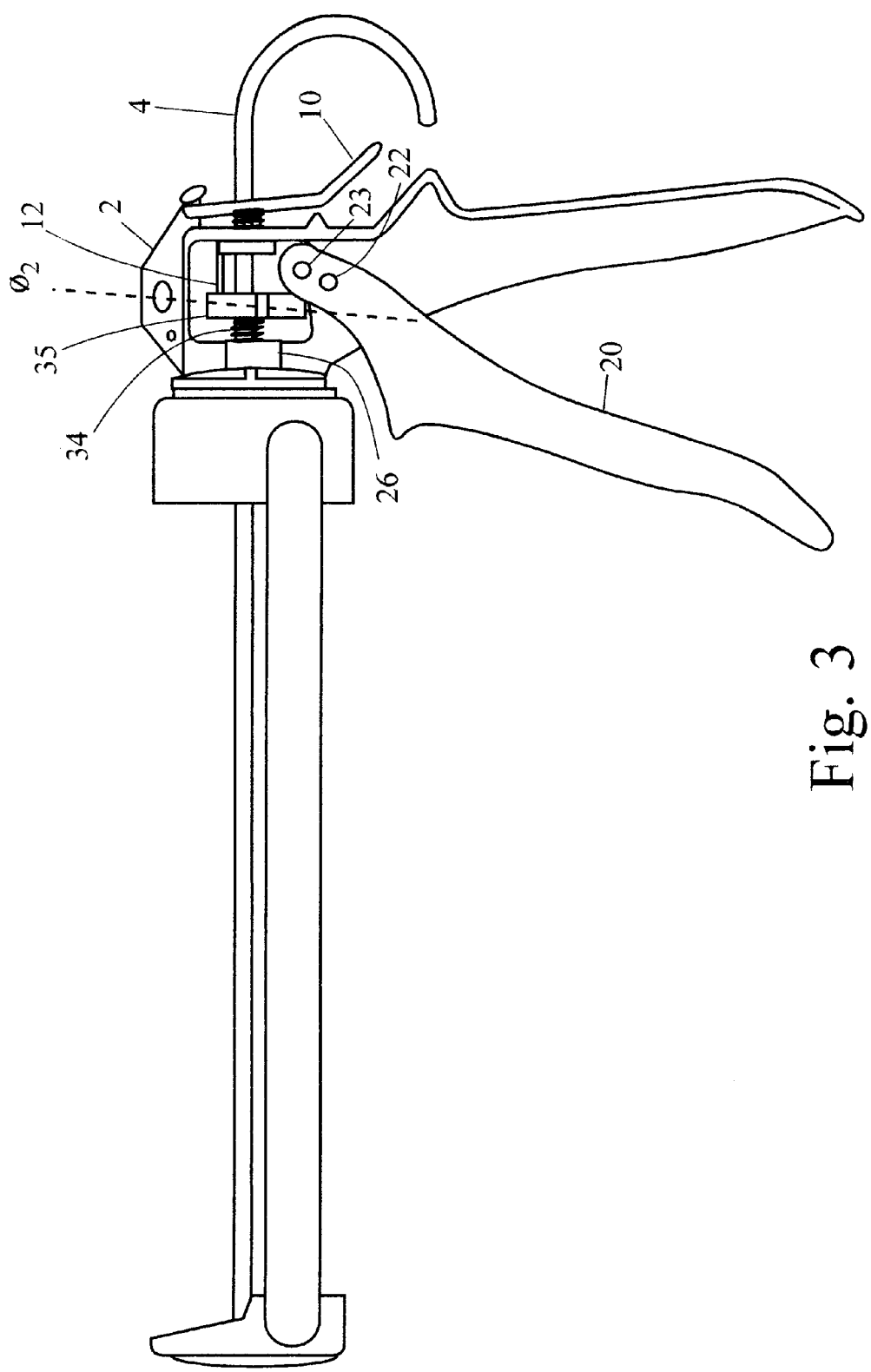
FIG. 3 is a close-up side view of the drive mechanism incorporating an effective trigger grip power device 12 as shown in FIG. 2.

FIG. 3 is a close-up side view of the drive mechanism as shown in FIG. 2. The piston rod 4 extends through, and is slidably carried within a supporting sleeve 26 formed integral to frame 2. Trigger 20 extends upwardly, straddles the rearward section of the frame 2, and is pivotally fixed to the rearward section of the frame 2 at screw hinge 22. An offset drive pin 23 extends transversely through trigger 20 and bears against a grip 35. Grip 35 is a substantially flat metal member having a through-bore near the top to pass piston rod 4, and a downwardly protruding leverage stem.

The above-described components effect the forward operation of the piston rod 4. The trigger 20 is retracted by hand and pivots counterclockwise about screw hinge 22. The offset drive pin 23 bears against grip 35 and urges it forward. As grip 35 is biased forward from the bottom it reaches a critical angle where it engages piston rod 4, and further retraction of trigger 20 is converted into lateral movement of piston rod 4.

When trigger 20 is released it is return-biased by a compression spring 34 acting through grip 35, and both the grip 35 and trigger 20 are pivoted clockwise about hinge 22 to their home position. As grip 35 moves into the vertical home position it releases piston rod 4.

A release-lever 10 hangs down against the rearward section of the frame 2, and release lever 10 serves to lock the piston rod 4 against inadvertent retraction. Release-lever 10 is formed with a through-bore to encircle piston rod 4, and is notched at the top edge to flank the frame. A lateral protrusion in the rearward section of the frame 2 captures the flanking release-lever 10 in a known manner. The release-lever 10 may be formed from a substantially flat elongate metal member with a through-bore to pass piston rod 4.

As explained previously, excessive wear and tear on the grip 35 over time enlarges its through-bore and causes excessive trigger slack. Even worse, the problem eventually causes piston rod lock when the hole in the grip 35 becomes so large that the grip tends to return past its normally-vertical upright position to an oppositely-canted position (ø2). Here, the piston rod 4 cannot be pulled back even if the release lever 10 is released.

The solution to the above-described problem is an effective trigger grip power device according to the present invention for maintaining grip 35 in a perfectly vertical home position despite wear and tear. An effective trigger grip power device 12 according to one embodiment of the present invention is shown in FIGS. 2 and 3.

Figure 4:
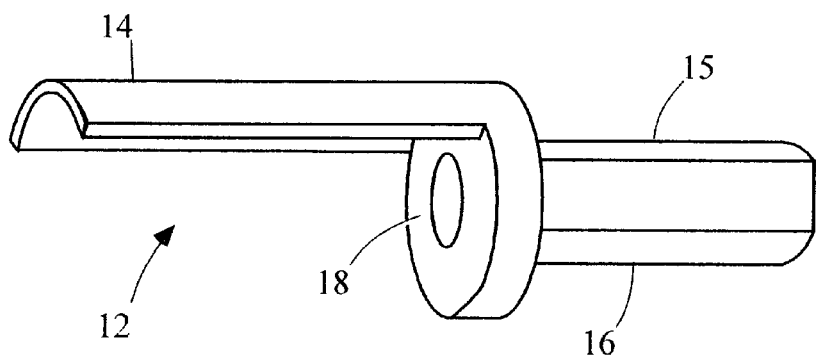
FIG. 4 is a close-up side view of the effective trigger grip power device 12 as shown in FIGS. 2 and 3.

FIG. 4 is a close-up side view of the effective trigger grip power device 12 as shown in FIGS. 2 and 3. The effective trigger grip power device 12 essentially comprises an offset pushing member 14 at one end that bears against the top of grip 35 to push it back into a vertical position, and a base section 15 that is slidably channeled through the frame 2 and extends to release lever 10 for actuation thereby. The base section 15 is keyed through frame 2 to prevent rotation. In this particular embodiment, the pushing member 14 of the effective trigger grip power device 12 is a unitary offset finger that protrudes outward from the front end for bearing against the top of grip 35 to push it back into a vertical position. The pushing member 14 extends from an annular collar mid-section 16 that abuts the frame 2, and base section 15 is a tubular sleeve that encircles the piston rod 4 and passes rearwardly out through the frame 2, extending to release lever 10 for actuation thereby.

Figure 5:
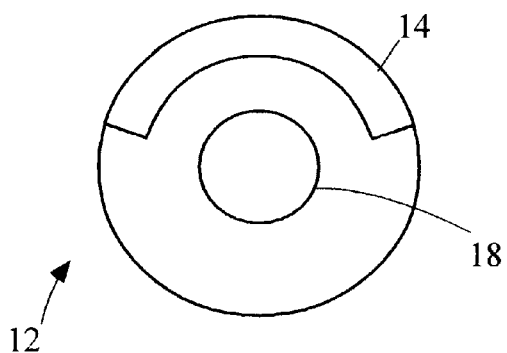
FIG. 5 is a close-up front view of the effective trigger grip power device 12 as shown in FIG. 4.

FIG. 5 is a close-up front view of the effective trigger grip power device 12 as shown in FIG. 4 which illustrates the central hole 18 as well as the offset finger of pushing member 14 that protrudes outward from the front end for bearing against the top of grip 35.

Figure 6:
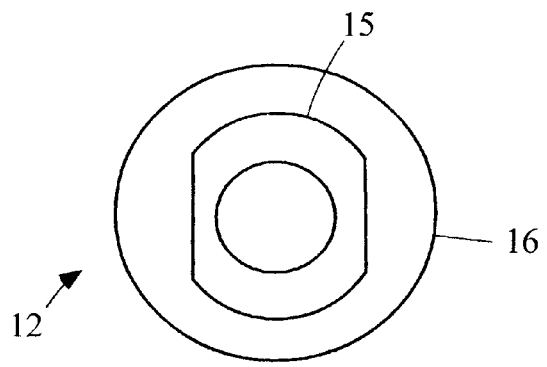
FIG. 6 is a close-up back view of the effective trigger grip power device 12 as shown in FIGS. 4 and 5.

FIG. 6 is a close-up back view of the effective trigger grip power device 12 as shown in FIGS. 4 and 5 that illustrates the keyed cross-section of sleeve section 15. The base section 15 is champfered on opposing sides and this conforms to an identical aperture through the rear of frame 2.

The operation of the effective trigger grip power device 12 will now be described with collective reference to FIGS. 2–6.

When trigger 20 is released it is return-biased by compression spring 34 acting through grip 35, and grip 35 slides back as trigger 20 pivots counterclockwise about hinge 22 to its home position. As grip 35 moves into the vertical home position it releases piston rod 4. The piston rod 4 can be pulled back and the caulk cartridge replaced after depressing the release-lever 10. However, if the hole through the gripping plate 35 has become enlarged due to wear and tear, piston rod lock might occurs wherein the gripping plate tends to return past its normally-vertical upright position to the oppositely-canted position (ø2). Because of the undesired cant of angle (ø2), the grip 35 again grips the piston rod 4, and the rod 4 cannot be pulled back even if the release plate 10 is released. The piston rod lock problem is solved by the effective trigger grip power device 12, which interposes itself between the rear of frame 2 and grip 35. With the annular collar 16 braced against the rear of frame 2, the pushing member 14 encounters the retreating grip 35. If the user now wishes to replace the caulk cartridge, the release plate 10 is depressed. The pivoting release plate 10 frees the piston rod 4 for rearward retraction, and it also pushes inward against the effective trigger grip power device 12. This biases the effective trigger grip power device 12 inward, and it begins pushing against the top of grip 35, thereby countering any undesired cant and eliminating the excess angle (ø2). The grip 35 is returned to its true vertical home position despite any wear and tear on its through-bore, and piston rod lock is eliminated. Again, it is important that the base section 15 be keyed through frame 2 to prevent rotation in order to maintain the proper offset position of pushing member 14.

Figure 7:
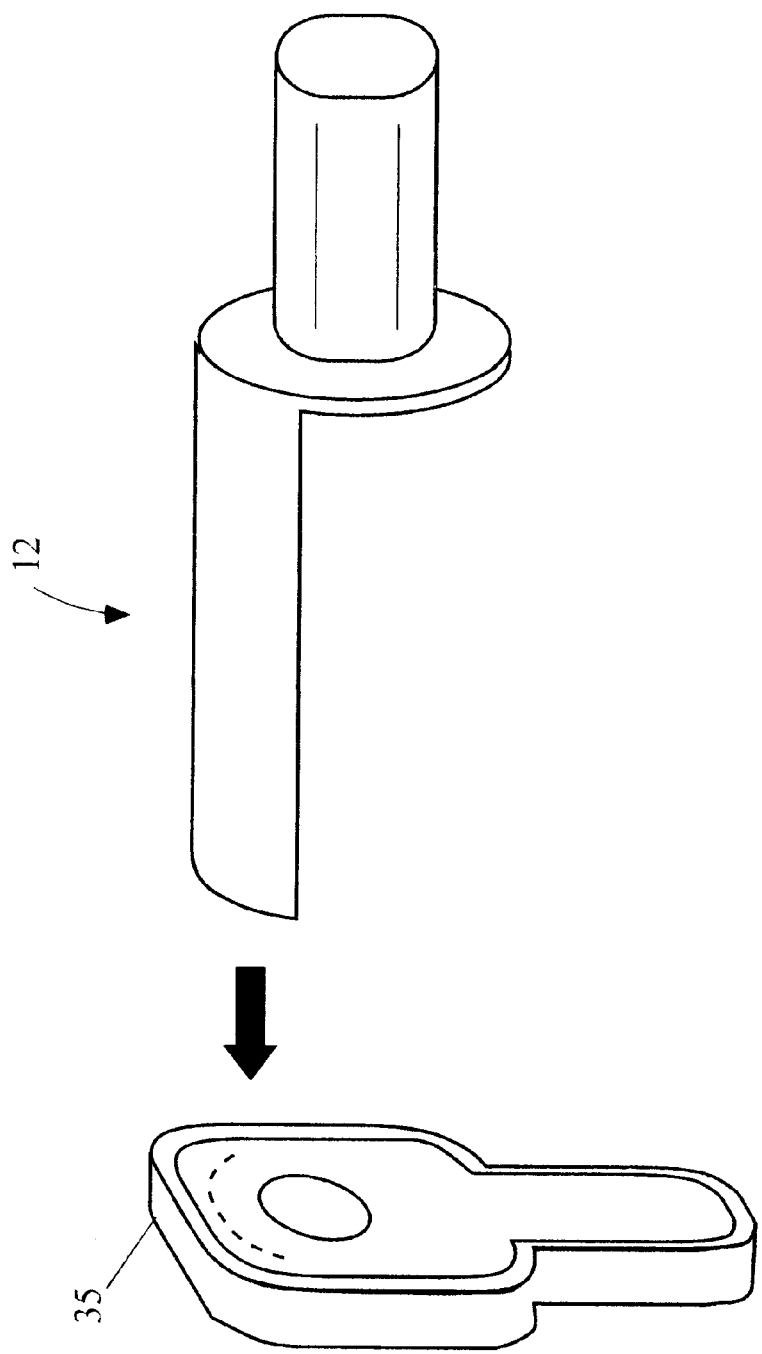
FIG. 7 is a perspective view of the effective trigger grip power device 12 as shown in FIGS. 2–6 opposing the grip 35 and illustrating the area of contact there between (dotted line).

FIG. 7 is a perspective view of the effective trigger grip power device 12 as shown in FIGS. 2–6 opposing the grip 35 and illustrating the area of contact there between (dotted line).

Figure 8:
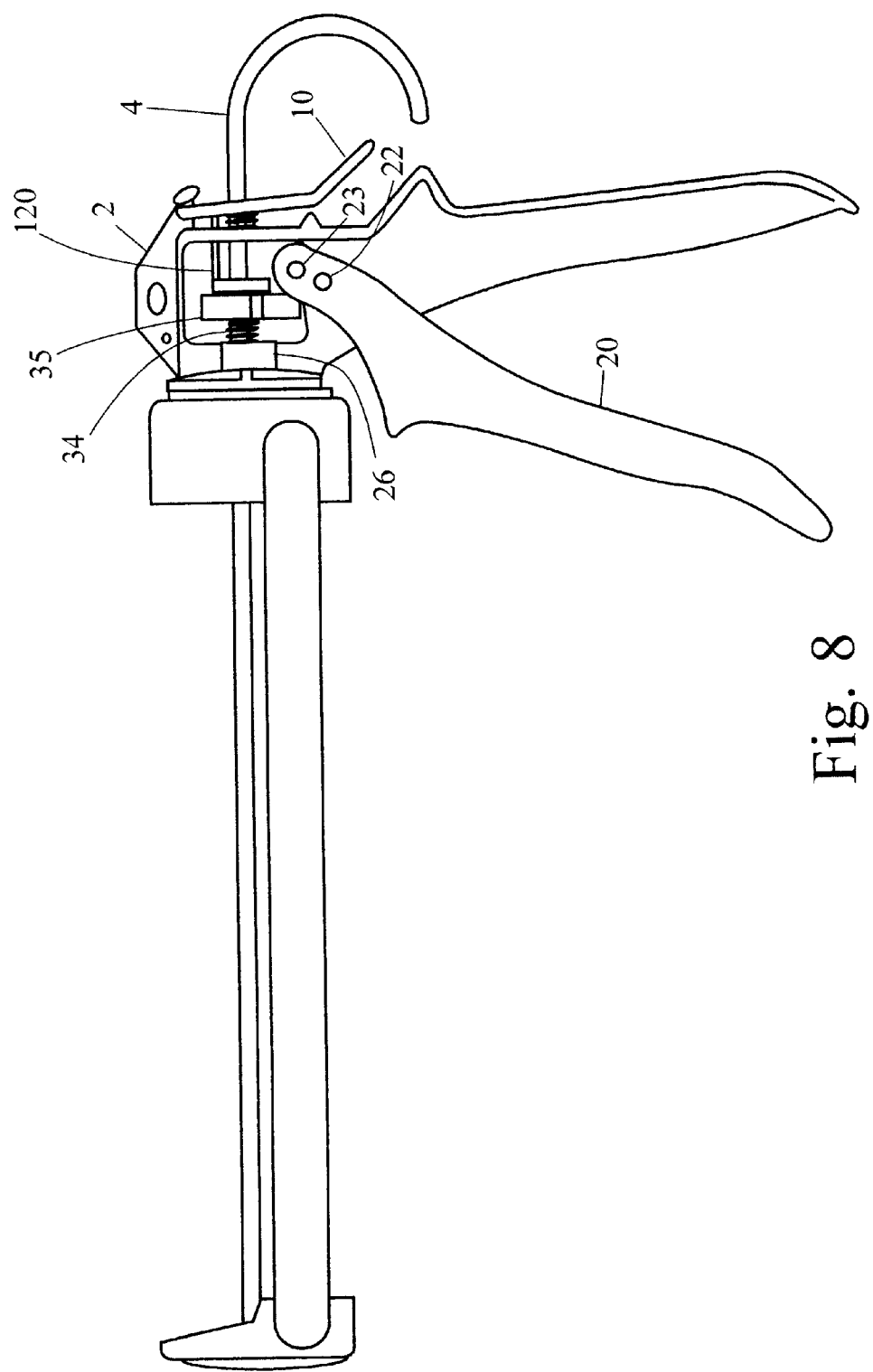
FIG. 8 is a close-up side view of an alternate embodiment of an effective trigger grip power device 120 similar to that shown in FIGS. 2–7.

FIG. 8 is a close-up side view of an alternate embodiment of an effective trigger grip power device 120 similar to that shown in FIGS. 2–7. The effective trigger grip power device 120 comprises a circular pushing disk 140 at one end that bears against the top of grip 35 to push it back into a vertical position, and rearwardly extending prongs 150 that are slidably channeled through the frame 2 and extend to release lever 10 for actuation thereby. In this particular embodiment, the pushing disk 140 and prongs 150 are integrally formed.

Figure 9:
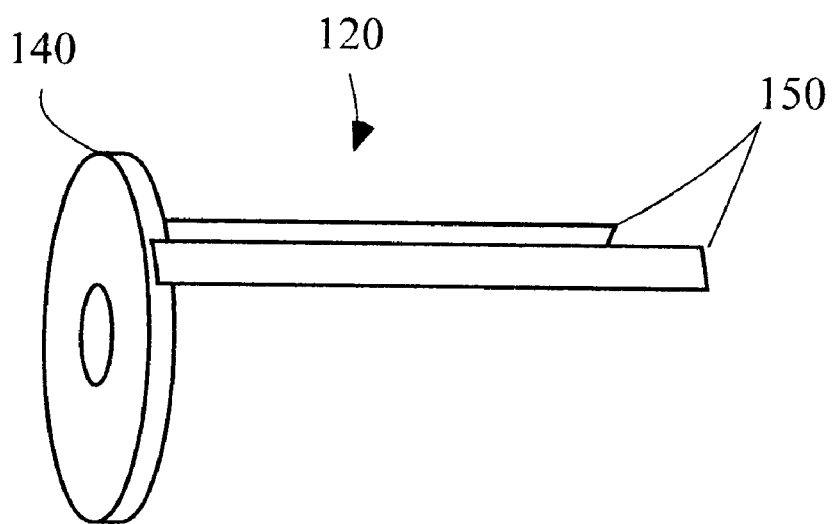
FIG. 9 is a close-up side perspective view of the effective trigger grip power device 120 as shown in FIG. 8 which illustrates the circular pushing disk 140 and integral rearwardly extending prongs 150

FIG. 9 is a close-up side perspective view of the effective trigger grip power device 120 as shown in FIG. 8 which illustrates the circular pushing disk 140 and integral rearwardly extending prongs 150. The opposing prongs 150 are channeled through separate holes in base 2 to prevent rotation.

The operation of the effective trigger grip power device 120 is essentially the same as the embodiment of FIGS. 2–7. The piston rod lock problem is solved by the effective trigger grip power device 120. When the user wishes to replace the caulk cartridge, the release plate 10 is depressed. The pivoting release plate 10 frees the piston rod 4 for rearward retraction, and it also pushes inward against the effective trigger grip power device 12. This biases the effective trigger grip power device 12 inward, and it begins pushing against the top of grip 35, thereby countering any undesired cant and eliminating the excess angle (ø2). The grip 35 is returned to its true vertical home position despite any wear and tear on its through-bore, and piston rod lock is eliminated. To ensure that the pushing disk 140 pushes against the top portion of the grip 35, the pushing disk 140 may be angled at an approximate 5 degrees with respect to prongs 150. Alternatively, the prongs 150 may be channeled at a slight upward angle through frame 2.

Having now fully set forth a detailed example and certain modifications incorporating the concept underlying the present invention, various other modifications will obviously occur to those skilled in the art upon becoming familiar with said underlying concept. It is to be understood, therefore, that within the scope of the appended claims, the invention may be practiced otherwise than as specifically set forth in the appended claims.

I claim:

1. A drive assembly for a caulking gun, comprising:
   a frame having a downwardly extending handle;
   a piston rod slidably supported in said frame for dispensing caulking composition;
   a trigger pivoted to said frame and retractable against said handle;
   a gripping member encircling the piston rod forwardly of said trigger and engaged thereby when said trigger is retracted to grip and advance said piston rod;
   a first compression spring rearwardly biasing said first gripping member;
   a release lever encircling said piston rod and extending upwardly behind said frame to a pivot point;
   an effective trigger grip power device including a pushing member at one end for bearing against the gripping member to urge it into a vertical position, and a base section that is slidably channeled through the frame and extending rearwardly to said release lever for actuation thereby;
   whereby depression of said release lever drives said effective trigger grip power device to urge said gripping member into a substantially vertical position to eliminate trigger lock.

2. The drive assembly for a caulking gun according to claim 1, wherein said base section of the effective trigger grip power device is keyed through said frame to prevent rotation.

3. The drive assembly for a caulking gun according to claim 1, wherein said pushing member of the effective trigger grip power device further comprises an offset finger for bearing against the top of said gripping member.

4. The drive assembly for a caulking gun according to claim 1, wherein said base section further comprises a tubular sleeve that encircles the piston rod and passes rearwardly out through the frame to said release lever for actuation thereby.

5. The drive assembly for a caulking gun according to claim 1, wherein said pushing member of the effective trigger grip power device further comprises an annular disk for bearing against the gripping member.

6. The drive assembly for a caulking gun according to claim 5, wherein said annular disk is held at an angle with respect to said gripping member to push against the top of the gripping member.

7. The drive assembly for a caulking gun according to claim 1, wherein said base section further comprises opposing prongs that straddle the piston rod and pass rearwardly out through the frame to said release lever for actuation thereby.

8. The drive assembly for a caulking gun according to claim 7, wherein said opposing prongs are slidably journaled through corresponding holes through said frame to prevent rotation of the effective trigger grip power device.

9. The drive assembly for a caulking gun according to claim 8, wherein said corresponding holes through said frame are angled with respect to said gripping member to ensure that said pushing disk pushes against the top of the gripping member.

10. In a drive assembly for a caulking gun having a frame with a downwardly extending handle, a piston rod, a trigger pivoted to said frame and retractable against said handle, a gripping member encircling the piston rod and engaged thereby when said trigger is retracted to advance said piston rod, a first compression spring rearwardly biasing said gripping member, and a release lever pivotally mounted behind said frame, an improvement comprising:

an effective trigger grip power device formed with a unitary pushing member at one end for bearing against the gripping member, and a base section that is slidably channeled through the frame and extending rearwardly to said release lever for actuation thereby;

whereby depression of said release lever drives said effective trigger grip power device to urge said gripping member into a substantially vertical position to eliminate trigger lock.

11. The effective trigger grip power device for a caulking gun according to claim 10, wherein said base section is keyed through said frame to prevent rotation.

12. The effective trigger grip power device for a caulking gun according to claim 10, wherein said pushing member further comprises an offset finger for bearing against a top portion of said gripping member.

13. The effective trigger grip power device for a caulking gun according to claim 10, wherein said base section further comprises a tubular sleeve that encircles the piston rod and passes rearwardly out through the frame to said release lever for actuation thereby.

14. The effective trigger grip power device for a caulking gun according to claim 10, wherein said pushing member further comprises an annular disk for bearing against the gripping member.

15. The effective trigger grip power device for a caulking gun according to claim 14, wherein said annular disk is held at an angle with respect to said gripping member to push against the top of the gripping member.

16. The effective trigger grip power device for a caulking gun according to claim 10, wherein said base section further comprises opposing prongs that straddle the piston rod and pass rearwardly out through the frame to said release lever for actuation thereby.

17. The effective trigger grip power device for a caulking gun according to claim 16, wherein said opposing prongs are slidably journaled through corresponding holes through said frame to prevent rotation of the effective trigger grip power device.

18. The effective trigger grip power device for a caulking gun according to claim 17, wherein said corresponding holes through said frame are angled with respect to said gripping member to ensure that said pushing disk pushes against the top of the gripping member.

* * * * *